(12) United States Patent
Bennett et al.

(10) Patent No.: US 6,463,402 B1
(45) Date of Patent: Oct. 8, 2002

(54) INFEED LOG SCANNING FOR LUMBER OPTIMIZATION

(76) Inventors: Ralph W. Bennett, 4600 Rumsgate Dr., Tallahassee, FL (US) 32308-2140; Robert W. Mayer, 1962 Chatsworth Way, Tallahassee, FL (US) 32308; Harold F. Qualls, 6979 Standing Pines La., Tallahassee, FL (US) 32312; Steven F. Bellenot, 1908 Sherwood Dr., Tallahassee, FL (US) 32303

(*) Notice: Subject to any disclaimer, the term of this patent is extended or adjusted under 35 U.S.C. 154(b) by 0 days.

(21) Appl. No.: 09/519,195

(22) Filed: Mar. 6, 2000

(51) Int. Cl.[7] .............................. G06F 7/60; G06F 7/10; G06G 7/48; B23Q 15/00; G06K 9/00
(52) U.S. Cl. ........................... 703/2; 703/6; 144/357; 144/402; 382/141
(58) Field of Search ................... 703/2, 6; 144/357, 144/402; 356/3.03, 3.06; 382/106, 141

(56) References Cited

U.S. PATENT DOCUMENTS

| | | | | |
|---|---|---|---|---|
| 3,811,487 A | * | 5/1974 | Warren et al. | 144/357 |
| 4,294,149 A | * | 10/1981 | Olsson | 83/435.21 |
| 4,424,530 A | * | 1/1984 | Taylor | 348/26 |
| 4,461,575 A | * | 7/1984 | Miller, Jr. et al. | 356/386 |
| 4,468,992 A | * | 9/1984 | McGeehee | 83/56 |
| 4,691,751 A | * | 9/1987 | Komulainen | 144/357 |
| 4,879,659 A | * | 11/1989 | Bowlin et al. | 364/474.09 |
| 4,947,909 A | * | 8/1990 | Stroud | 144/357 |
| 5,262,956 A | * | 11/1993 | DeLeeuw | 364/474.13 |
| 5,421,385 A | * | 6/1995 | McGee | 144/357 |
| 5,615,003 A | * | 3/1997 | Hermary et al. | 356/3.03 |
| 5,627,635 A | * | 5/1997 | Dewan | 356/3.06 |
| 5,765,617 A | | 6/1998 | Mierau et al. | |
| 5,884,682 A | * | 3/1999 | Kennedy et al. | 144/357 |
| 5,905,567 A | * | 5/1999 | Dewan | 356/3.06 |
| 5,960,104 A | * | 9/1999 | Conners et al. | 382/141 |
| 5,986,745 A | * | 11/1999 | Hermary et al. | 356/3.03 |
| 6,026,689 A | * | 2/2000 | Snyder et al. | 73/602 |
| 6,029,522 A | * | 2/2000 | Schafer et al. | 73/598 |

* cited by examiner

Primary Examiner—Kevin J. Teska
Assistant Examiner—William Thomson
(74) Attorney, Agent, or Firm—John Wiley Horton

(57) ABSTRACT

A method for creating a full surface model of a log using optical scanners mounted on an existing infeed assembly. The method recognizes that a log is only stable for a portion of its travel along the infeed assembly, meaning that only portions of the log may be accurately scanned for both cross-sectional and positional data. The balance of the log can only be scanned for cross-sectional data. The method uses the regions of the log for which both cross-sectional and positional data are known to create a theoretical centerline for the entire log. The cross-sections for the regions without positional data are then placed along the theoretical centerline and all the cross sections are blended together to create a full surface model. The full surface model is then used to determine the optimum configuration of dimensioned lumber which may be sawn from the log.

4 Claims, 19 Drawing Sheets

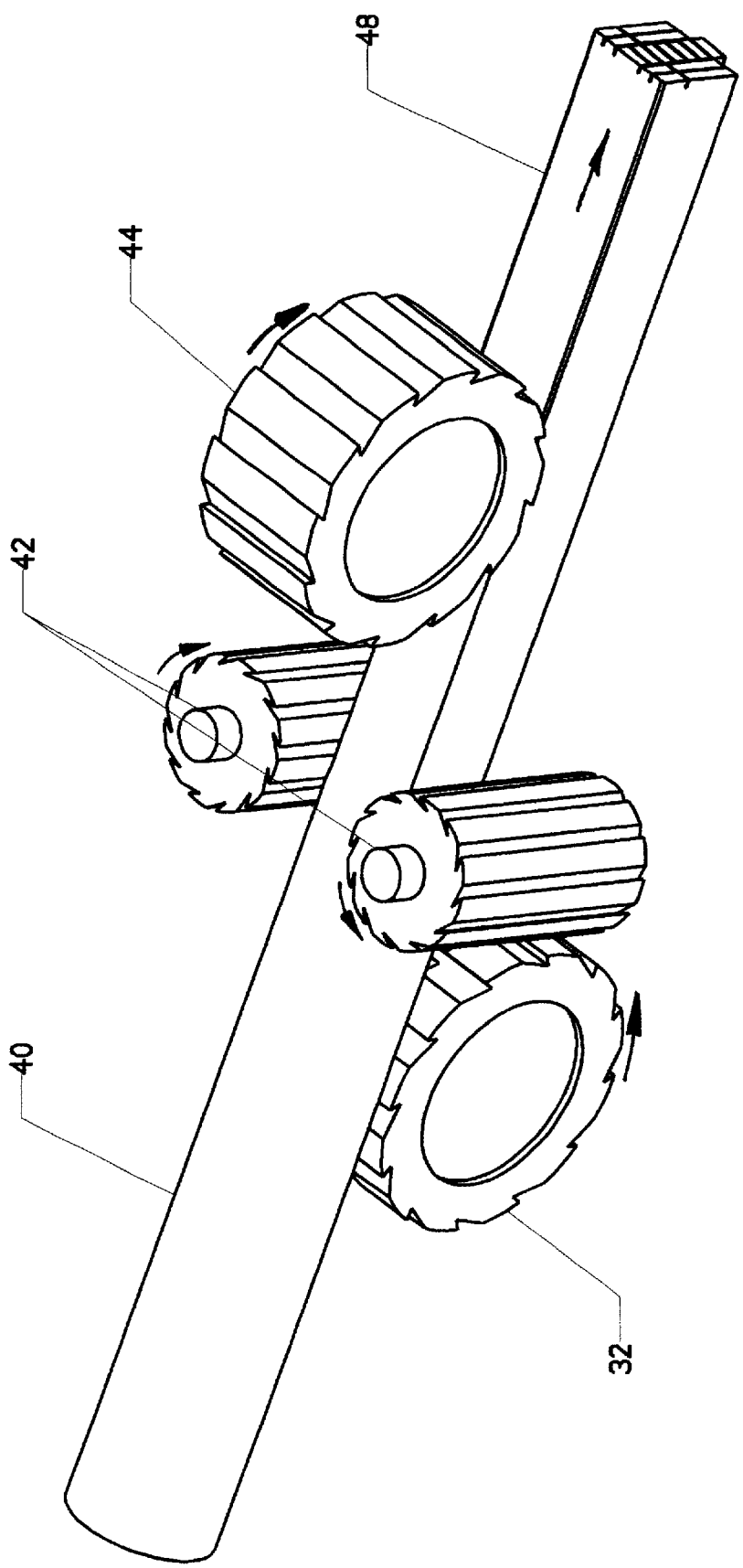
FIG.1-A

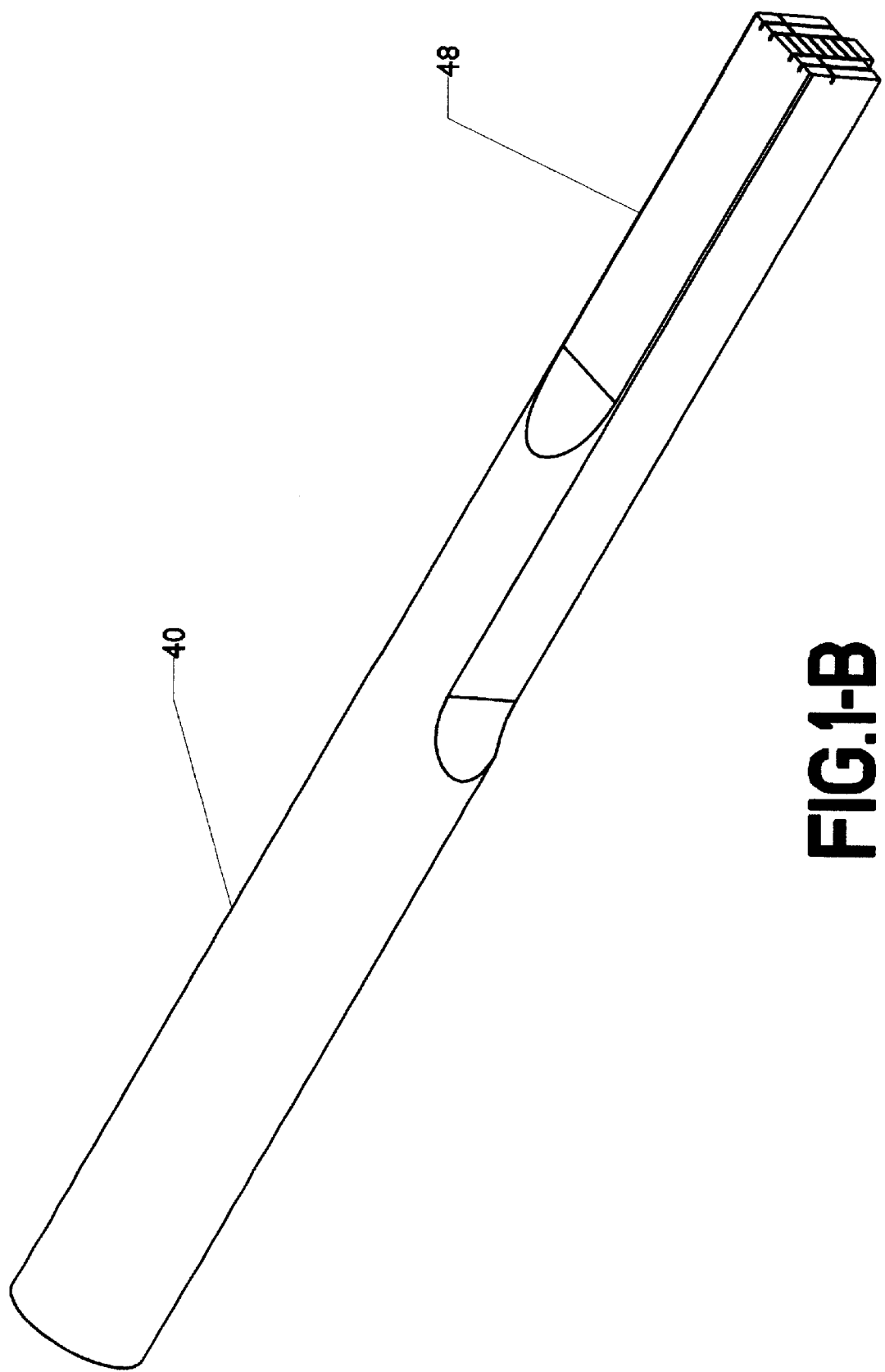

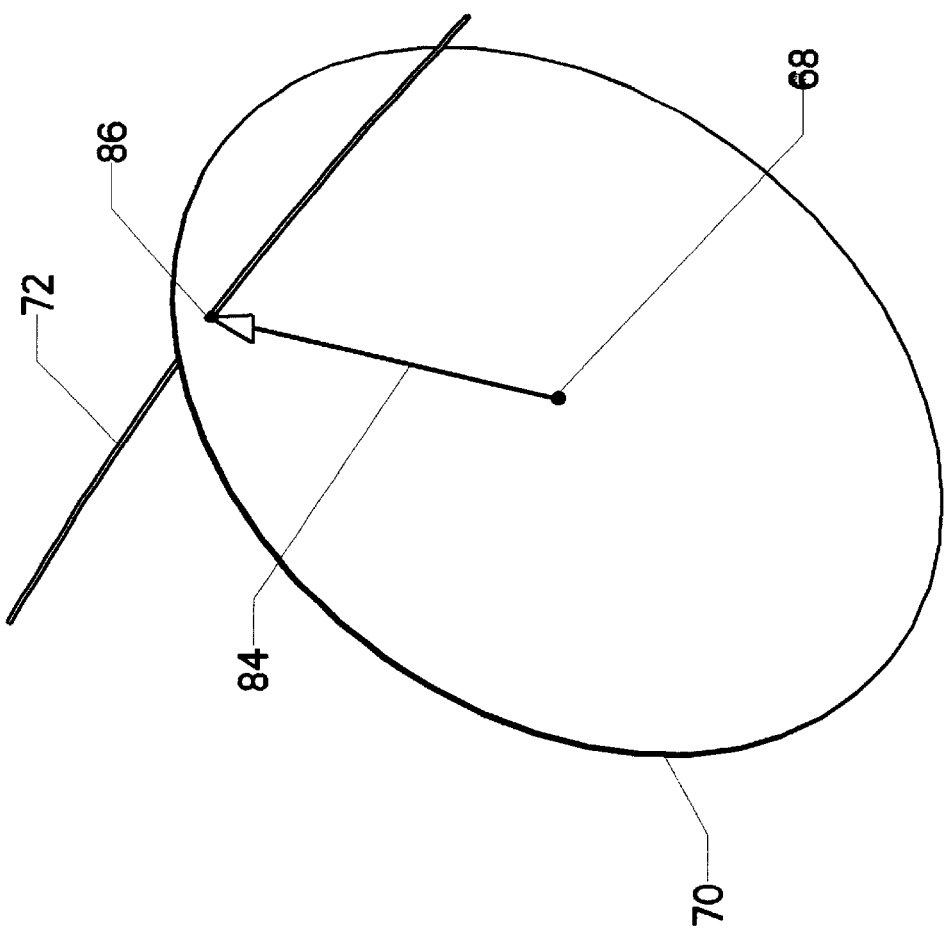
FIG. 12-B

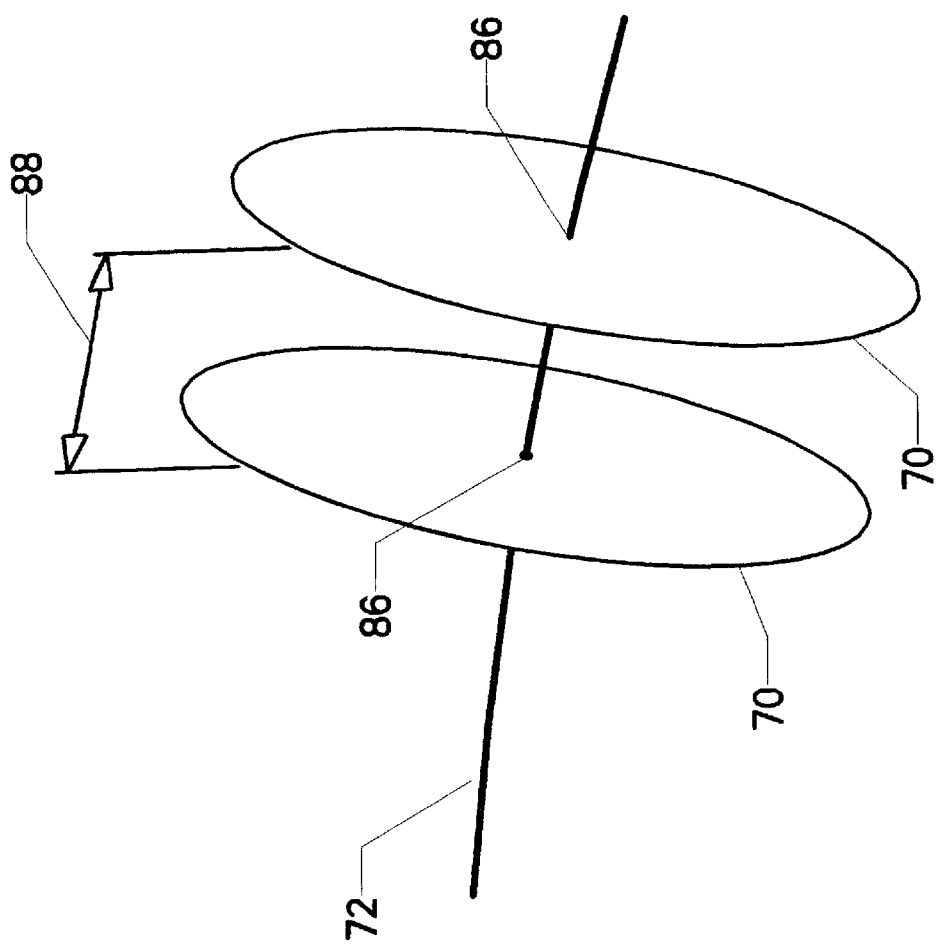
FIG. 13-B

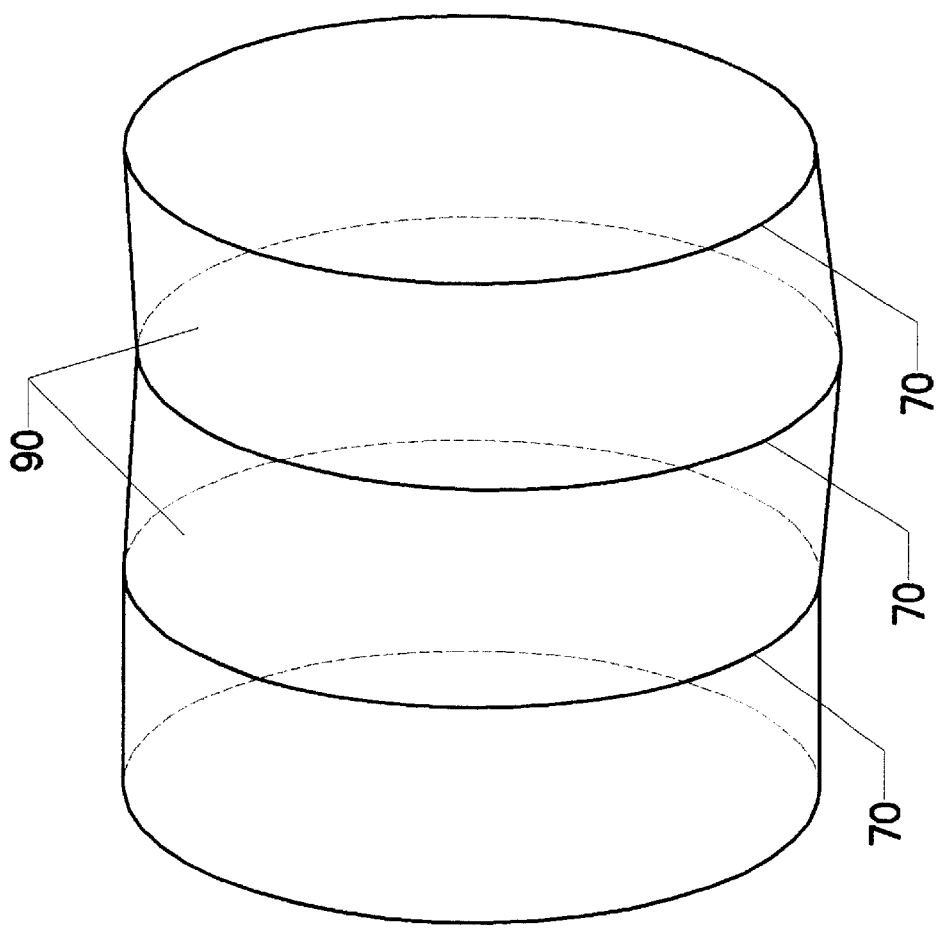

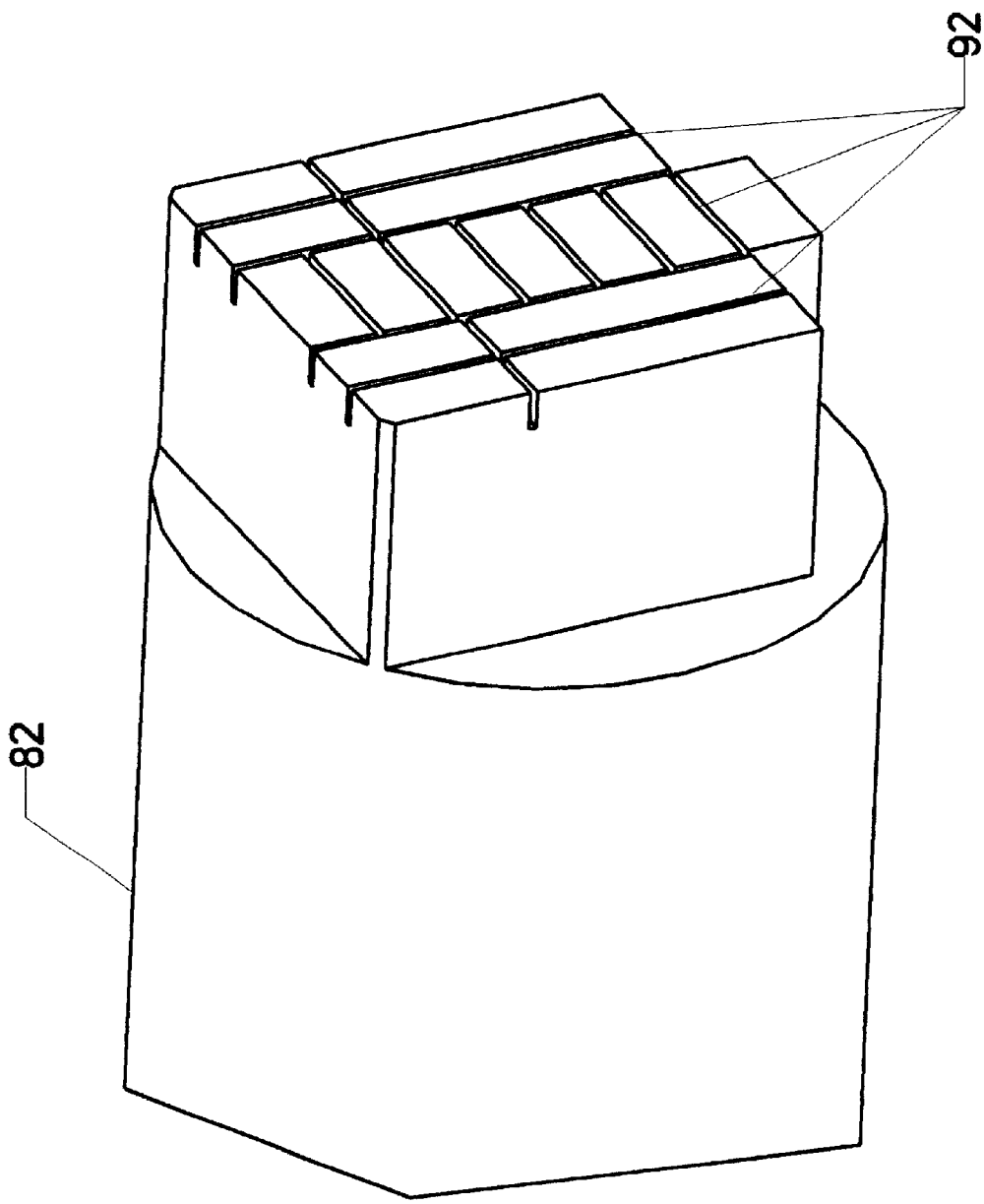

INFEED LOG SCANNING FOR LUMBER OPTIMIZATION

BACKGROUND

1. Field of Invention

This invention relates to the field of lumber mill sawing. More specifically, the invention comprises a process for scanning a log while it moves through the infeed section of a sawing operation, manipulating the data thereby obtained, calculating the optimum pattern of boards to be obtained from the particular log, and using that information to position the logs, chipping heads and saws to cut the log into said optimum pattern.

2. Description of Prior Art

Converting trees in a forest into finished wood products is a lengthy process. The first step is cutting down the tree. Next, the limbs are removed. This leaves the long and slender trunk, commonly called a "stem." The stem is then transversely cut into selected lengths, in an operation called "stem bucking." A long stem may be cut into as many as four separate sections, which are then called "logs."

The larger diameter logs are often used to make framing lumber (such as 2×4's, 2×6's, etc.). The key to optimizing the use of a given log is determining what type and length of boards may be cut from the log while producing the minimum amount of waste. In recent years, computers have been used to calculate the optimum solution. In order to employ a computer, however, one must know the external dimensions of the log in question. Thus, the surface characteristics of the log must be accurately measured.

Optical scanning technology of varying sophistication has long been employed to determine the characteristics of a given log. The earliest applications of this technology appear to be in the field of veneer lathes. A veneer lathe grips a log securely by its sawn ends and rotates it against a long knife, which peels the log into a layer of thin veneer. This is a relatively slow process, and it was therefore well-suited to the slow scanning and computing speeds of the 1970's. A good example of this technology is found in U.S. Pat. No. 3,852,579 to Sohn et.al. (1974). The Sohn device maps the log surface as it is turned slowly on the spindle of the veneer lathe. Similar devices, particularly adapted to the veneer lathe, are illustrated in U.S. Pat. No. 4,246,940 to Edwards et.al. (1981), U.S. Pat. No. 4,383,560 to McGee (1983), U.S. Pat. No. 4,397,343 to Fields (1983), U.S. Pat. No. 4,884,605 to Ely (1989), and U.S. Pat. No. 5,518,052 to Westberg et.al. (1996). All these devices make use of the existing veneer lathe spindles to rotate the log.

The same approach has been applied to non-veneer systems; i.e., scanning to optimize sawing for lumber production. Illustrating this adaptation are U.S. Pat. No. 4,197,888 to McGee et.al. (1980), U.S. Pat. No. 4,867,213 to Bolton et.al. (1989), and U.S. Pat. No. 5,257,101 to Lee (1993). All these devices scan the surface of the log by rotating it between two spindles. While this technique is acceptable for a veneer lathe, which must be configured to grip and rotate the log in order to cut the veneer, it is impractical for normal lumber production. In normal lumber production, the logs are moved rapidly in a direction parallel to their long axis. The line speeds are typically around 300 to 400 feet per minute. A system which requires the log to remain stationary while it is rotated and scanned is not practical where line speeds are this high.

Because the conveying line in sawing operations is nearly always in motion, scanning methods that could work without stopping the log were developed. The earliest of these were simple "profile" scanners, which were only capable of determining the silhouette of the log. Illustrating this stage in the development is U.S. Pat. No. 4,316,491 to Kearnes et.al. (1982). The Kearnes device scans the profile (or silhouette) of the log as it moves past. It is capable of determining the profile in one or two planes, and then using that crude data to shift the log in order to optimize lumber production as the log is fed into the saws. As the technology evolved, interpolation was applied to the silhouette data to produce an approximate (albeit crude) surface model of the entire log. This technique is illustrate by U.S. Pat. No. 4,879,659 to Bowlin et.al. (1989). The Bowlin device also uses a laser-based camera scanner to detect surface imperfections once the initial chipping operations are complete. The use of this simple surface scanner marks another step in the evolutionary progress of log scanning. However, the '659 device only maps a cross section of the log by measuring four tangent points spaced 90 degrees apart (determined from silhouettes taken in two planes 90 degrees apart). The computer then generates an elliptical cross section matching these four points. Unfortunately, many logs have a much more complex cross-section. Thus, while the Bowlin device represents an advancement, it is still far from achieving complete optimization of the lumber process.

A similar scanning process is disclosed in U.S. Pat. No. 4,947,909 to Stroud (1990). The Stroud device uses profile scanning in two planes to determine a curved cutting path through the log in order to optimize lumber recovery. It also creates only a crude representation of the surface by measuring the log's silhouette. Thus, like Bowlin, it represents a limited advance.

Yet another profiling type scanning system is shown in U.S. Pat. No. 5,414,268 to McGee (1995). The McGee device uses a complex array of lasers and sensors to rapidly determine the log'silhouette in two orthogonal planes. However, the log must be moved slowly into and out of the scanning field in a direction perpendicular to its long axis. As explained previously, such a system is impractical for most lumber sawing operations, where the logs are continuously moved in a direction parallel to their long axis.

U.S. Pat. No. 5,429,161 to Allard (1995) discloses a more sophisticated form of scanning. The Allard device scans the log after two planar faces have been cut on opposite sides (the resulting processed log is often called a "cant"). The scanners can detect the transition point between the rough natural surface of the log and the smooth planar face. This information is fed into a computer and used to optimize subsequent resawing operations on the cant. It is significant to note, however, that the prior chipping or sawing of the two planar surfaces in the creation of the cant in itself represents a loss of optimality in the entire process. Considerable wood may have been wasted in creating the planar surfaces before the scanning station is even reached. Thus, a system which can determine surface characteristics of the entire log prior to any wood removal would be much better than the device disclosed in Allard.

A real-time scanner adapted to process logs traveling in a direction parallel to their long axis is disclosed in U.S. Pat. No. 5,765,617 to Mierau et.al. (1998). The Mierau device uses two scanners to control the rotation and skew of a log being fed into chippers and saws for cutting dimensioned lumber. While this device is capable of scanning a log without interrupting its linear travel down the line, it does require an infeed conveyor having a length of at least twice the longest log length that will be fed into the system. This increase in the required conveyor length can be a significant disadvantage, especially where a scanning system is being added to an existing line. Extending the infeed conveyor to twice the length of the longest log may require reconfiguring the entire line to obtain the additional length. Given that most of the processing equipment is set permanently in place and weighs several hundred tons, this fact is a significant impracticality.

The known methods for scanning the surface of a log and using the data to optimize chipping and sawing operations are therefore limited in that they:

1. Require the log's motion along the line to be stopped while the log is rotated and scanned;
2. Provide only profile, or silhouette data, rather than true surface model;
3. Provide only a crude surface model by fitting circles or ellipses through four known tangent points along the log's surface;
4. Only scan the log after two planar surfaces have been chipped away; and
5. Require a significant extension in the length of the infeed conveyor.

OBJECTS AND ADVANTAGES

Accordingly, several objects and advantages of the present invention are:

1. To scan the log without the need for interruption in the log's movement along the line;
2. To provide a full model of the log's surface, rather than just silhouette data;
3. To model the log's cross sections using enough surface points to accurately reflect the shape of the log, rather than using approximating circles or ellipse;
4. To scan and map the surface of the log before any chipping or sawing is performed;
5. To scan and map the log's surface without requiring a substantially lengthened infeed conveyor;
6. To use the developed surface model of the log to compute the optimum solution of dimensioned lumber to be cut from the log; and
7. To provide a scanning and mapping system that is fast enough to allow the scanning of the log, generation of the surface model, computation of the optimum lumber solution, and movement of the chippers and saws, while the log is traveling at line speed.

DRAWING FIGURES

FIG. 1-A is an isometric view, showing the process of creating a cant from a log in simplified form.

FIG. 1-B is an isometric view, showing the cant with the cutters removed for visual clarity.

FIG. 2 an isometric view, showing the process of creating a cant from a log in simplified form from a different viewing angle.

Figure 12:
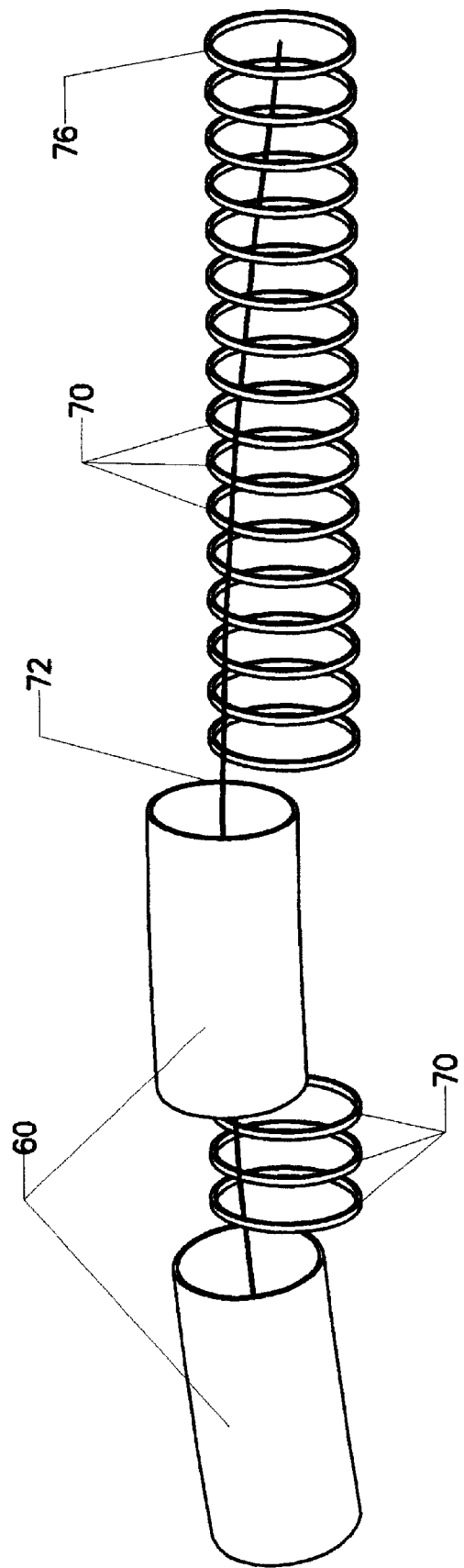
FIG. 12 is an isometric view, showing the surface data available from the scanners.

FIG. 12-B is an isometric view, showing the translation of a cross section to place it on the calculated centerline.

Figure 13:
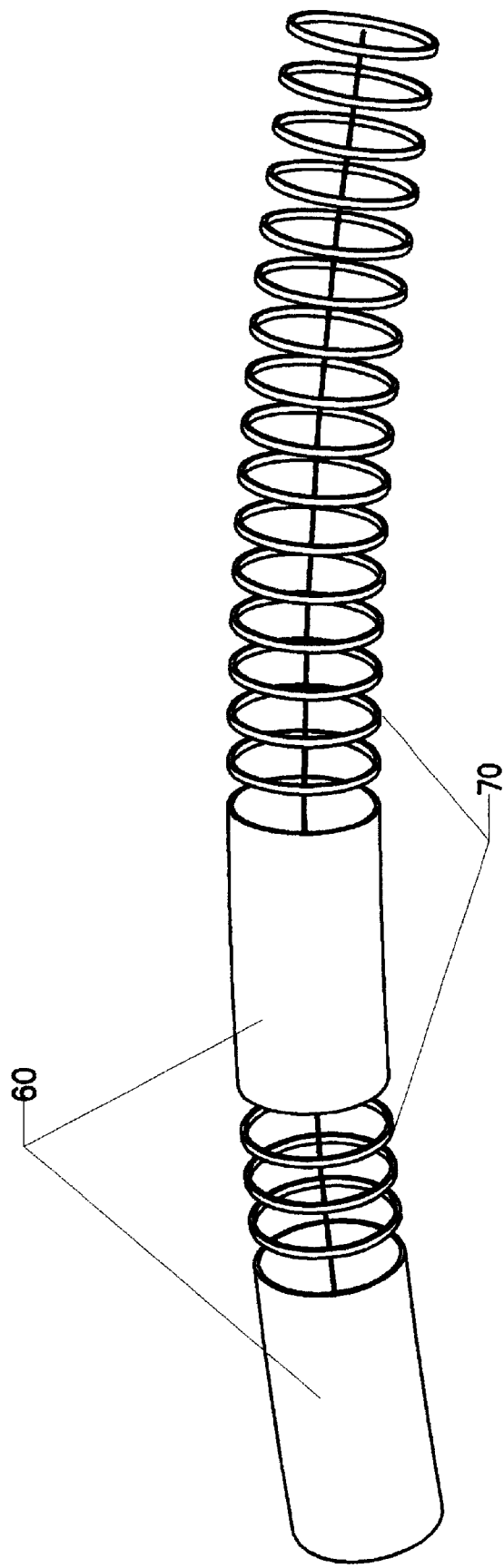

FIG. 13 is an isometric view, showing how the known surface data is manipulated to closely approximate the surface of the log.

FIG. 13-B is an isometric view, showing how the cross sections are spaced apart.

FIG. 13-C is an isometric view, showing how a surface model is created by linearly interpolating between the cross sections.

Figure 14:
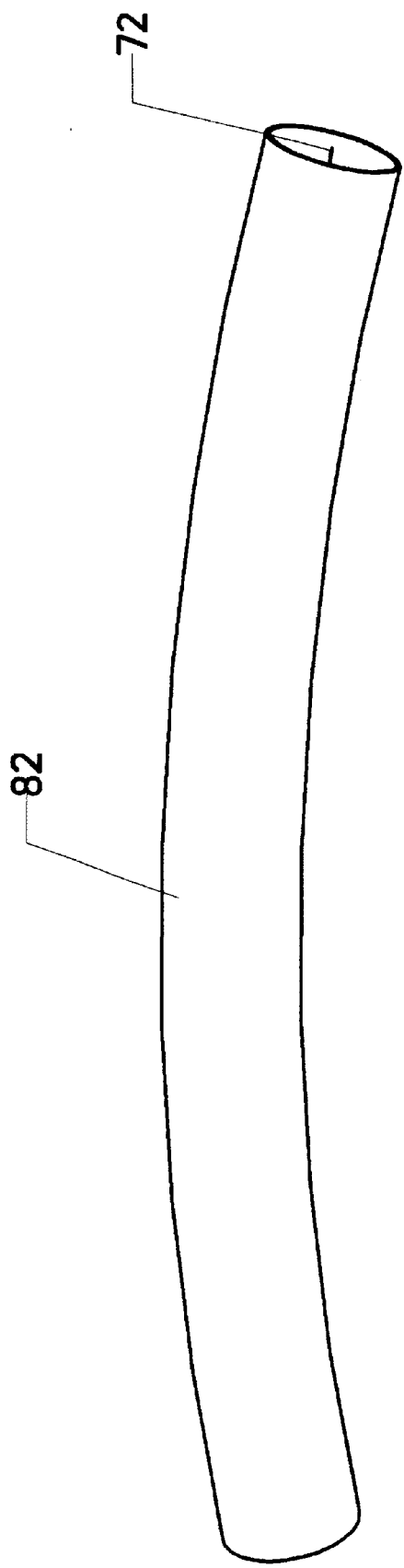

FIG. 14 is an isometric view, showing the completed surface model of the log.

FIG. 15 is an isometric view, showing how an optimized lumber cutting pattern is created from the surface model.

REFERENCE NUMERALS IN DRAWINGS

| | |
|---|---|
| 10 infeed frame | 12 chain conveyor |
| 14 chain flight | 16 optical scanner |
| 18 first scanner mount | 20 spike roll |
| 22 press roll | 24 press roll mount |
| 26 chipping head frame | 28 infeed assembly |
| 30 chipping head assembly | 32 bottom chipping head |
| 34 keel groove | 36 spur roller |
| 38 spur roller mount | 40 log |
| 42 side chipping head | 44 top chipping head |
| 46 second scanner mount | 48 preliminary cant |
| 50 bottom groove | 52 side boards |
| 54 keel board | 56 center cant |
| 58 saw kerf | 60 full scan area |
| 62 section scan area | 64 surface points |
| 66 approximated points | 68 calculated center |
| 70 cross section | 72 calculated centerline |
| 74 guide bar | 76 known leading section |
| 78 scan arc | 80 calculated radius |
| 82 surface model | |

SUMMARY OF THE INVENTION

The present invention seeks to achieve full surface mapping of incoming logs without significantly increasing the length of the existing infeed. The full surface mapping defines the three-dimensional space occupied by the log. A computer is then used to trial fit various framing lumber into the space in order to determine the optimum configuration of framing lumber which may be cut from the log.

It is often not possible to fully scan the log surface in the available infeed linear space. Different mills have different length infeeds, corresponding to the maximum length of framing lumber they are designed to produce. For example, a mill designed to create 16 foot long boards would have an infeed approximately 18 feet in length, a mill designed for 8 foot boards would have a 10 foot infeed, etc. Any scanning and optimization must generally be accomplished within the available infeed space; i.e., it is typically impractical to extend the infeed significantly in order to gain more scanning room. This practical limitation means that a surface model of the log will have to be constructed without having full scan data for the entire log. For a 16 foot mill, it is not generally possible to fully scan logs which approach 16 feet in length. However, it is possible to gain cross sectional data for the entire length of the log. It is also possible to gain both cross-sectional and positional data (meaning that the cross section is mapped and its X and Y position off the conveyor is known) for two portions of the log. Turning to FIG. 12, these fully known portions are indicated as full scan areas 60. The areas where cross section data only is available are denoted as cross sections 70. The present invention uses the full data acquired from the two full scan areas 60 to generate calculated centerline 72. A theoretical center point is then determined for each cross section 70. This center point is used to place each cross section 70 along calculated centerline 72. FIG. 13 shows a graphical representation of the log once all the cross sections 70 have been placed along calculated centerline 72. The reader will appreciate that FIGS. 12 and 13 are a simplified representation. In reality, many more cross sections are used.

Curve fitting techniques are then used to blend cross sections 70 into a smooth surface incorporating the two fill scan areas 60. A completed surface model is shown in FIG. 14. The completed surface model is then used to calculate the optimum cutting of framing lumber from the given log.

Description

FIG. 1-A is a simplified representation of the process used to create preliminary cant 48. Log 40 is fed in the direction shown by the arrow. Rotating bottom chipping head 32 cuts into the bottom portion of log 40. Side chipping heads 42 plane flat surfaces along the sides of log 40. Top chipping head 44 planes a flat surface along the top of log 40. The feed mechanism for log 40 and the mounting, positioning, and driving system for the chipping heads are not shown in order to aid visual clarity. Some of these mechanisms will be explained in detail later. FIG. 1-B shows log 40 with the chipping heads removed, so that the reader may better appreciate the nature of the cuts made.

Figure 2:
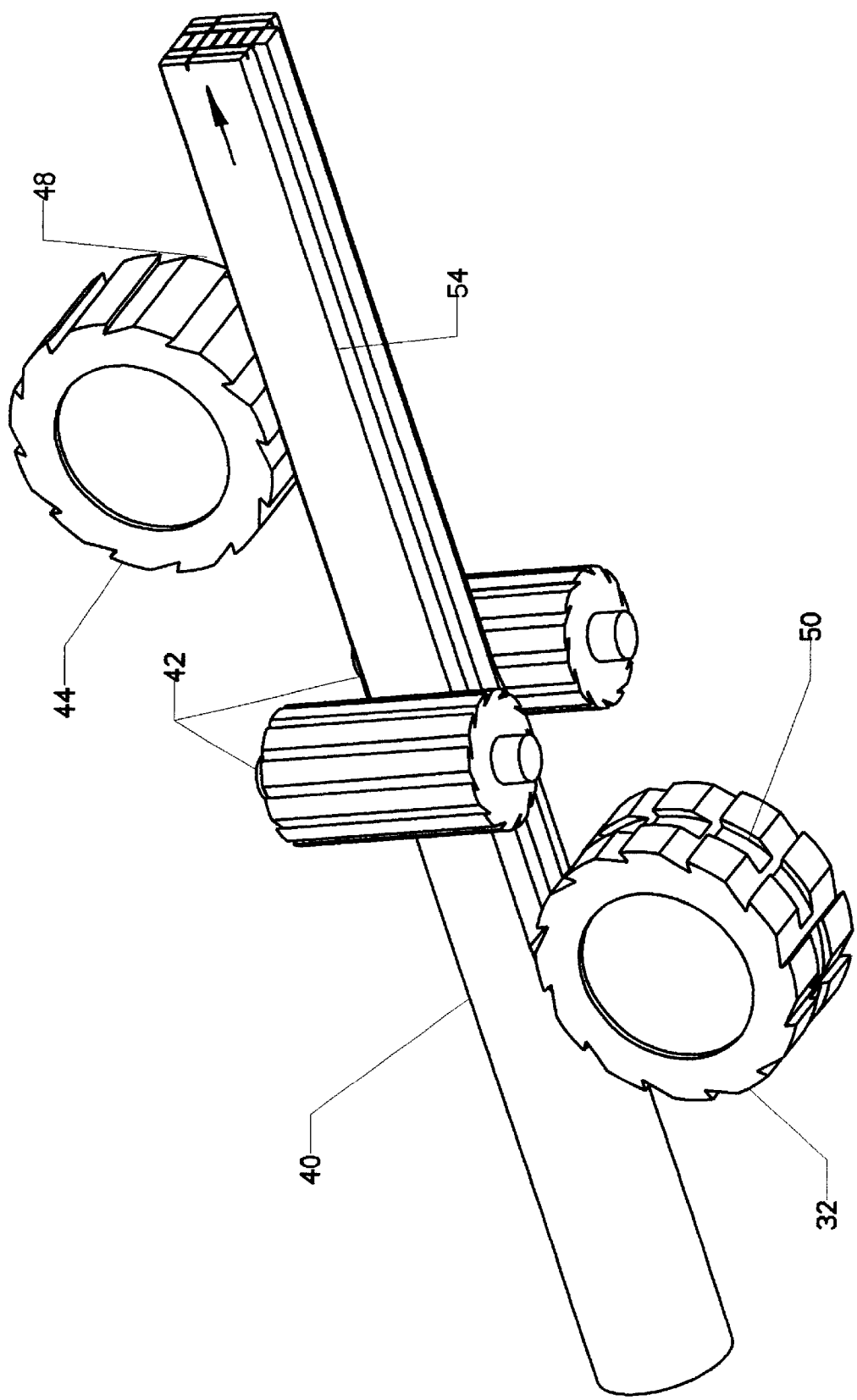

FIG. 2 shows a lower view of the same process depicted in FIG. 1. Bottom chipping head 32 has bottom groove 50. As log 40 is advanced in the direction shown, bottom groove 50 creates keel board 54 along the bottom of preliminary cant 48.

The various chipping heads may be moved closer together and further apart in order to create a preliminary cant 48 having planar surfaces with desired dimensions. Preliminary cant 48 may then be sawn into dimensioned lumber.

Figure 3:
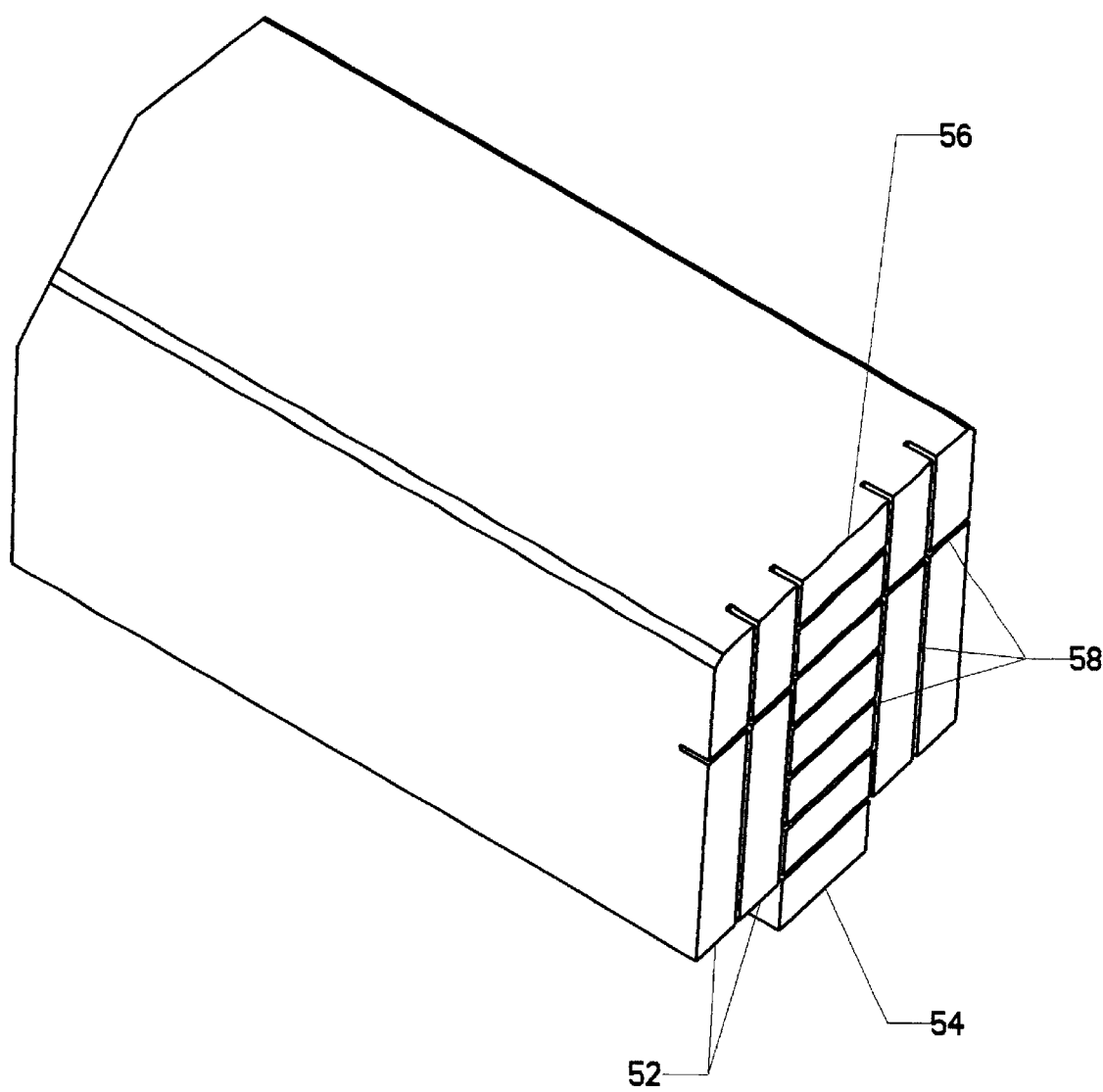
FIG. 3 is an isometric view, showing in simplified form how the log is sawn into dimensioned lumber.

Turning now to FIG. 3, the process of sawing preliminary cant 48 will be briefly explained. Saw kerfs 58 represent the cuts made into the wood by large circular or band saws used to divide preliminary cant 48 into dimensioned framing lumber. Side boards 52 are typically removed first. Preliminary cant 48 is then rotated 90 degrees and the boards within center cant 56 are divided. Numerous additional mechanisms are required to perform these steps. As they are within the common understanding of those skilled in the art, they have not been illustrated.

Figure 4:
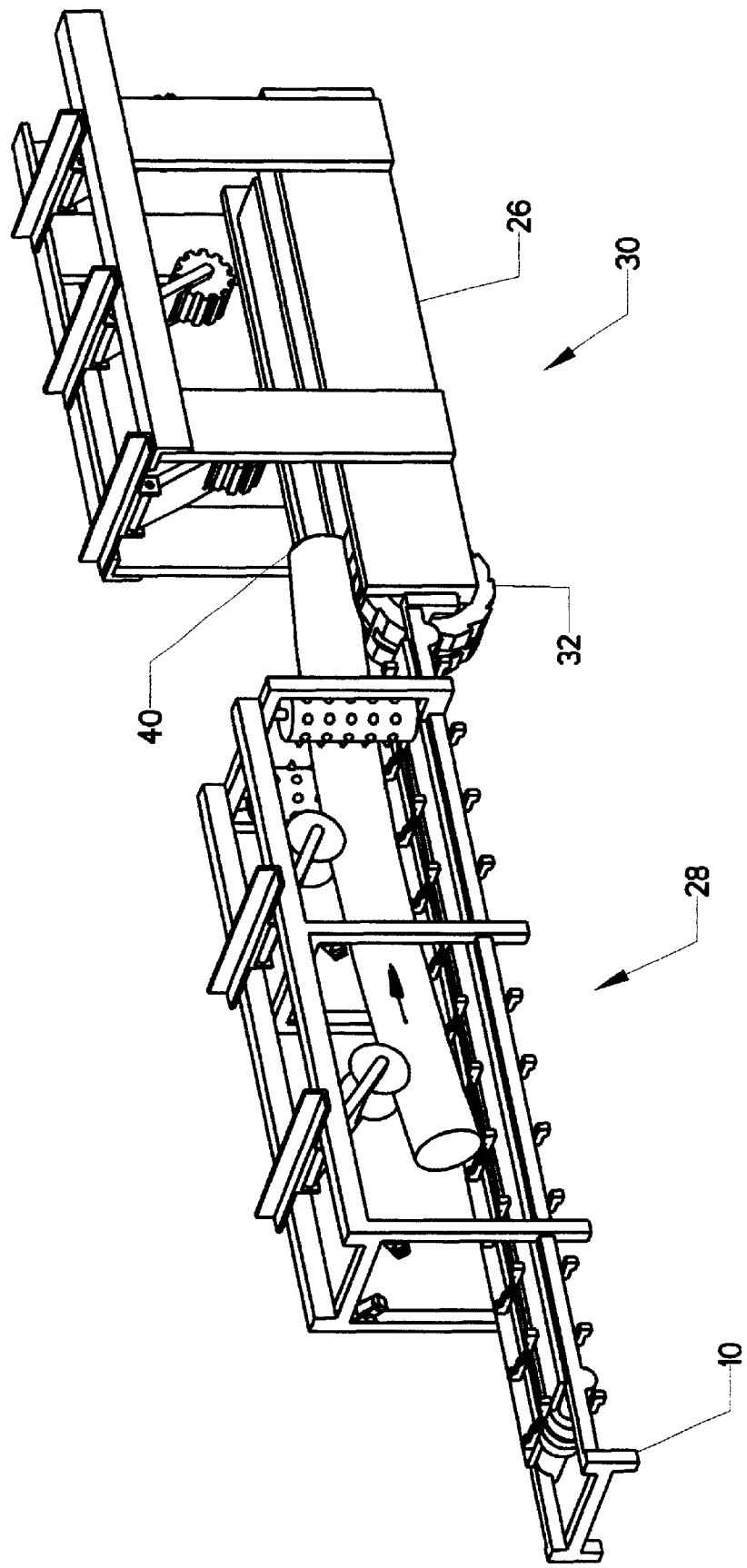
FIG. 4 is an isometric view, showing the infeed and bottom chipping head assemblies for an exemplary type of sawing machine.

Turning now to FIG. 4, the infeed and chipping head mechanisms will be explained in greater detail. Infeed assembly 28 has infeed frame 10, which mounts the various required hardware. Chipping head assembly 26 is located immediately adjacent to infeed assembly 28. Chipping head assembly 30 has chipping head frame 26, which mounts additional hardware. Bottom chipping head 32 is shown in position in chipping head frame 26. Side chipping heads 42 and top chipping head 44 are also normally contained within chipping head frame 26. In order to aid visualization, they are not shown.

The reader should note that the novel aspects of this invention relate to the scanning methodology and data manipulation used on infeed assembly 28, and not to the chipping and sawing operations. Portions of the chipping and sawing process have been illustrated in order to facilitate the reader's understanding. However, as these processes are commonly understood by those skilled in the art, detailed illustration of the other portions is unnecessary. The reader should also note that the illustrated chipping and sawing mechanisms are only one type of machine among many types commonly in use. The present invention is adaptable to virtually any type of chipping and sawing machine.

Figure 5:
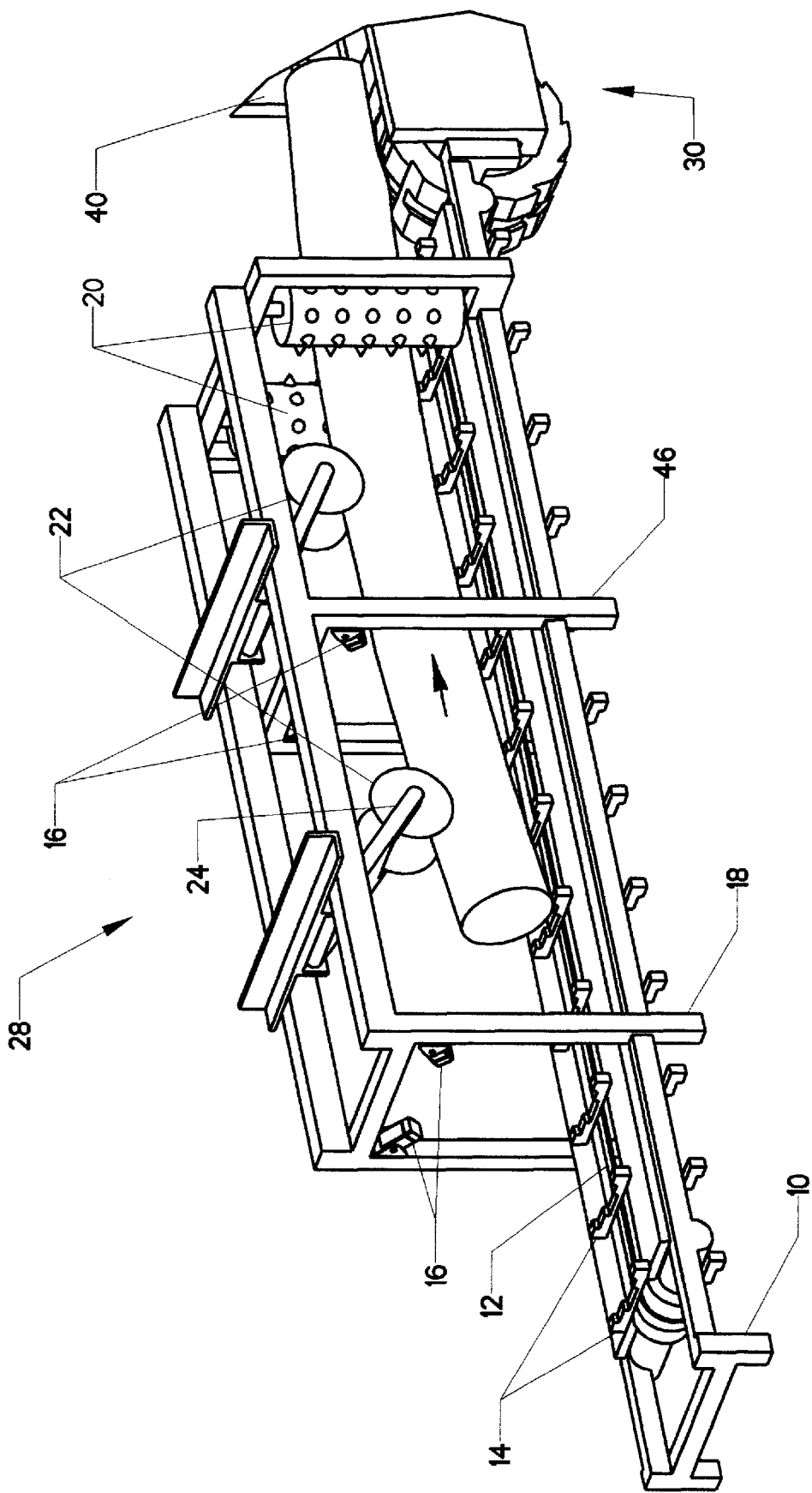
FIG. 5 is an isometric view, showing the infeed assembly in greater detail.

FIG. 5 illustrates infeed assembly 28 in greater detail. Infeed frame 10 mounts chain conveyor 12. Chain conveyor 12 is driven in the direction indicated by the arrow. Chain conveyor 12 has attached to it a plurality of chain flights 14. Chain flights 14 are notched so that they tend to center log 40 on chain conveyor 12.

Log 40 is pressed firmly down on chain conveyor 12 by press rolls 22. Press rolls 22 are held in place by press roll mounts 24, which, in turn, are pivotally attached to the upper portion of infeed frame 10. Press rolls 22 are free to roll along the upper surface of log 40 as chain conveyor 12 pulls it along. They are commonly pressed against log 40 by hydraulic cylinders (not illustrated).

Infeed assembly 28 is needed to properly orient log 40 before chipping can begin. It is also the most logical place to perform scanning and surface mapping of the log. First scanner mount 18 mounts a pair of optical scanners 16. Second scanner mount 46 mounts another pair of optical scanners 16.

Once log 40 is on chain conveyor 12 and pressed in place by press rolls 22, it is relatively stable. However, once log 40 begins to proceed off the end of chain conveyor 12 and into chipping head assembly 30, this stability is lost. Spike rolls 20 are provided to remedy this problem. Before the leading end of log 40 proceeds off the end of chain conveyor 12, the sides of log 40 are engaged by spike rolls 20. Spike rolls 20 have numerous sharp spikes distributed on their outer surfaces. These dig into the sides of log 40 as spike rolls 20 turn with the passing of log 40. Spike rolls 20 are pressed inward against log 40 by hydraulic mechanisms (not illustrated). They are often also driven so that they push log 40 along at the same rate as chain conveyor 12.

Spike rolls 20 inhibit log 40 from moving up and down and rotating as it proceeds out of infeed assembly 28 and into chipping head assembly 30. Thus, any surface mapping of log 40 achieved while it is progressing through infeed assembly 28 ideally remains valid through the rest of the process. The word "ideally" is used because some shifts in position inevitably occur.

Figure 6:
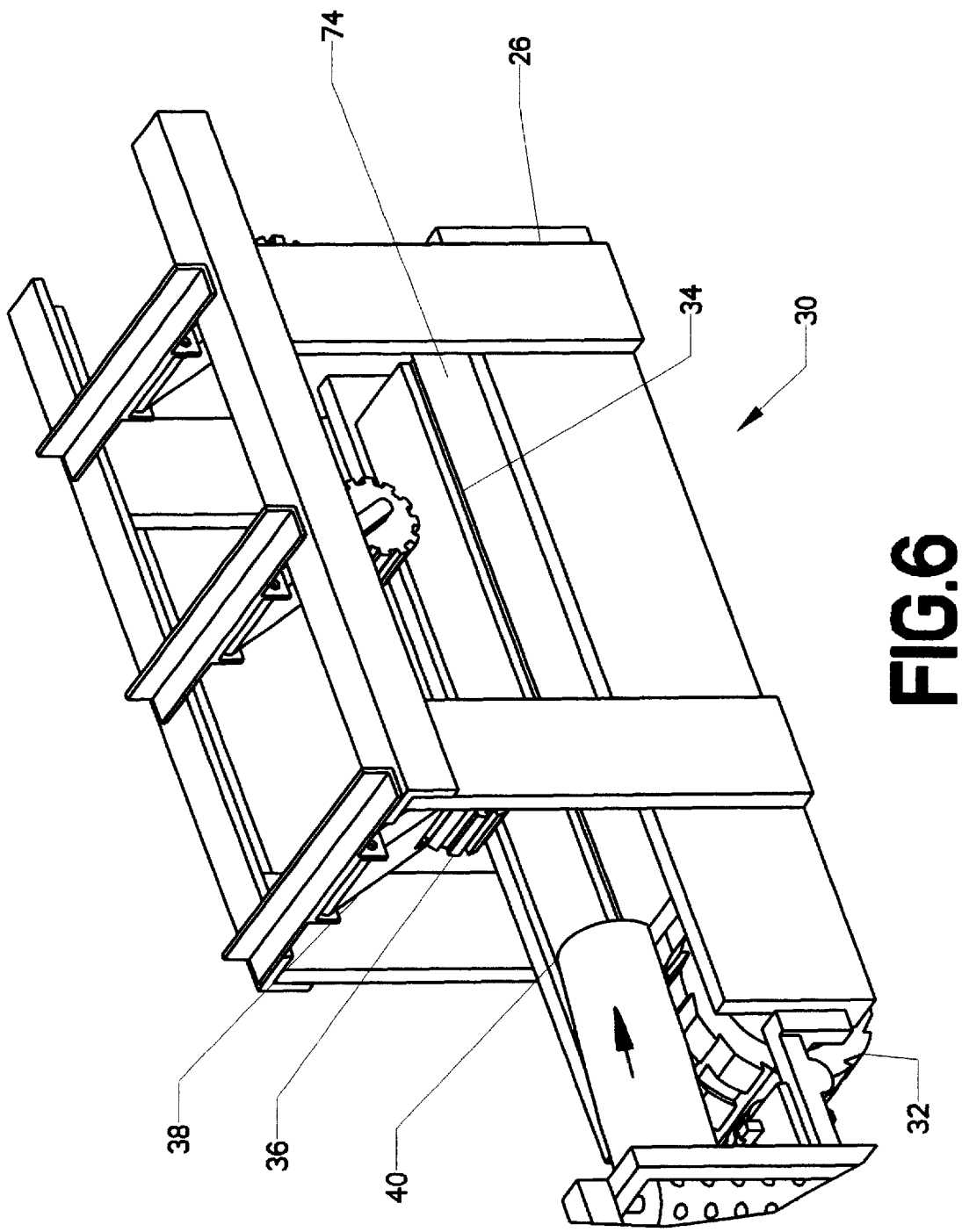
FIG. 6 is an isometric view, showing the bottom chipping assembly in greater detail.

FIG. 6 illustrates chipping head assembly 30 in more detail. Chipping head frame 26 mounts bottom chipping head 32. As explained previously, side chipping heads and a top chipping bead would normally also be housed within chipping head frame 26. For purposes of visual clarity, these have not been illustrated. Once log 40 has been pushed though bottom chipping head 32, its lower surface has keel board 54. Keel groove 34 is provided in guide bar 74 to act as a guide for keel board 54. Spur rollers 36 are held by spur roller mounts 38, which, in turn, are mounted to the upper portion of chipping head frame 26. Spur rollers 38 press against the top of log 40. They are also driven rotationally, so as to advance log 40 along guide bar 74.

Figure 7:
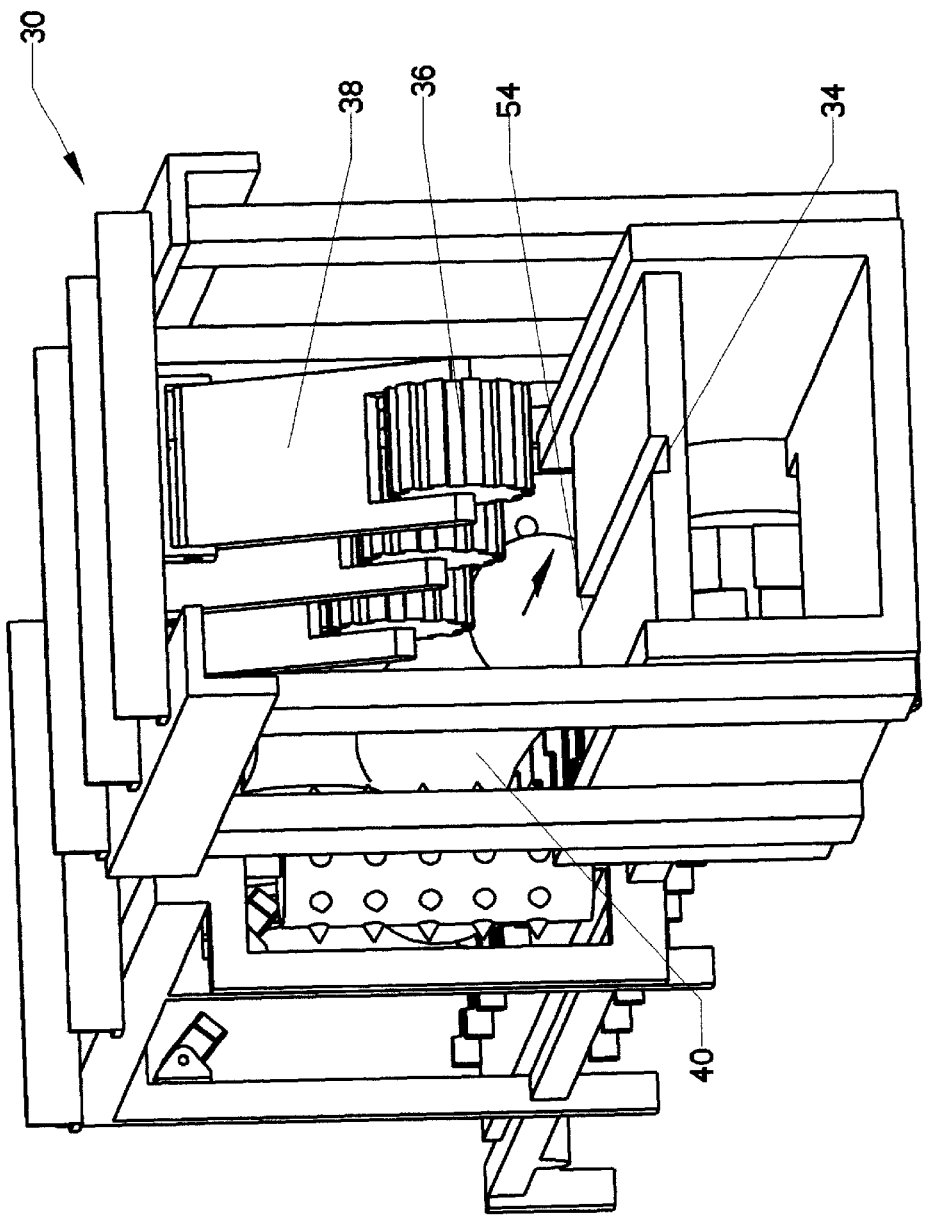
FIG. 7 is an isometric view, showing the bottom chipping assembly from another angle.

FIG. 7 illustrates chipping head assembly 30 from another perspective. The reader will observe that as log 40 advances past bottom chipping head 32, keel board 54 slips into keel groove 34. Spur rollers 36 are pressed down into place and driven by hydraulic mechanisms. As these are commonly understood in the art, they have not been illustrated.

Figure 8:
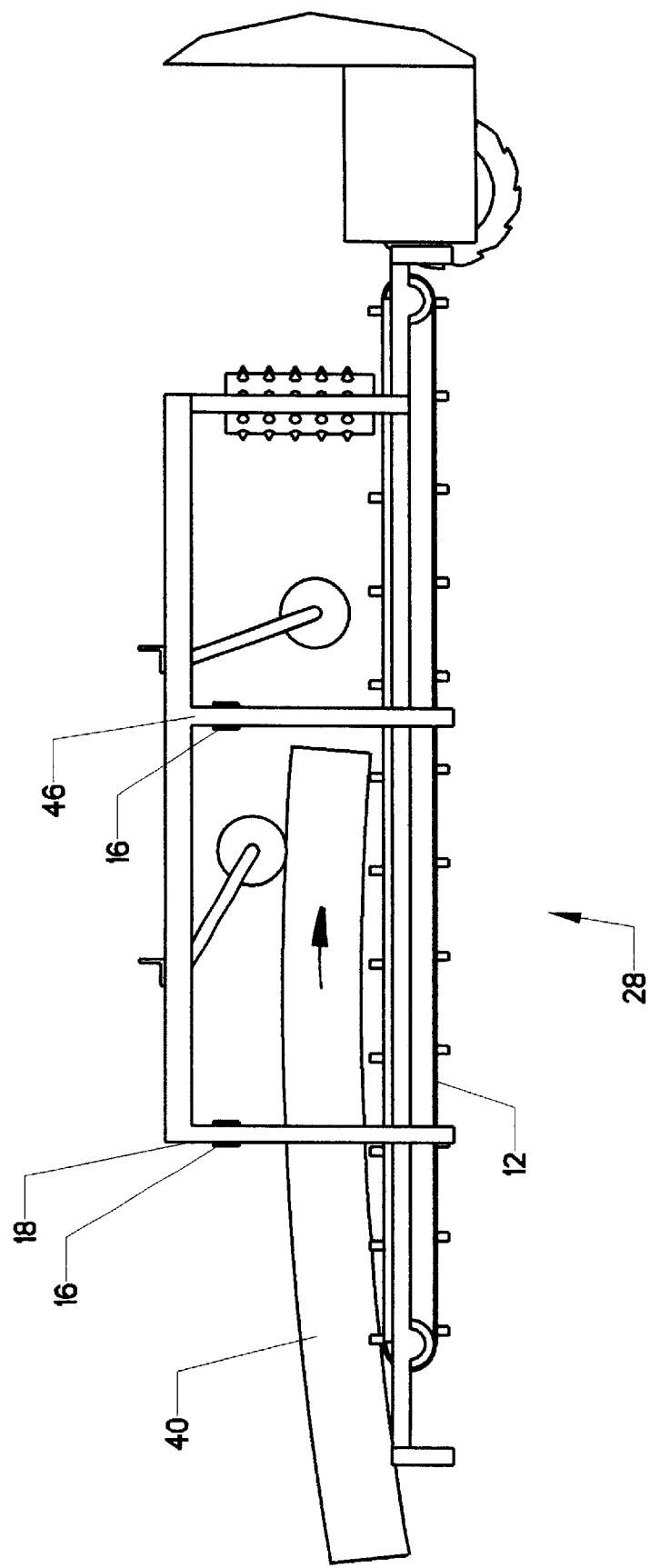
FIG. 8 is a side, elevation view, showing a log progressing onto the infeed assembly.

FIG. 8 illustrates a side elevation view of infeed assembly 28, as log 40 is fed in the direction indicated by the arrow. Log 40 is seen to have a significant warp. It is positioned with its ends down on chain conveyor 12, and its middle bowed upward therefrom. This configuration is often called "horns down." The warpage phenomenon is common, which fact presents a significant challenge to any attempt to surface map the log. As log 40 progresses onto chain conveyor 12 in the direction indicated, the trailing edge of log 40 is rising upward. Thus, log 40 is in an unstable transitional phase. In other words, log 40 is both translating to the right in the view shown, and rotating clockwise in the view shown.

The pairs of optical scanners 16 located at first scanner mount 18 and second scanner mount 46 are able to accurately map cross sections taken along log 40, which are transverse to the long axis of log 40. The distance between each cross section is also known because the speed of chain conveyor 12 is known. For example, if optical scanners 16 are set to measure ten cross sections per second, and chain conveyor 12 is moving at a rate of 72 inches per second, then one may easily calculate the distance between each cross section to be 7.2 inches. However, it is important to realize that although optical scanners 16 can accurately measure the cross sections, it is not possible to easily fix these cross sections in their X and Y positions relative to chain conveyor 12 because log 40 is still moving up and down and side to side with respect to chain conveyor 12. It is therefore impossible to easily determine whether a measured up and down or side to side undulation in the log is real, or just a product of the log bouncing and rotating as it transitions onto chain conveyor 12. The outline or profile of each cross section is known, but its position in space is unknown. The reader should also note that log 40 is often warped in two planes, though the warpage in the X plane (as denoted in FIG. 11) has not been illustrated for purposes of simplicity.

There is one important exception to this rule. Since log 40 will be placed on chain conveyor 12 in the "horns down" configuration, one may assume that the leading edge of log 40 is relatively stable with respect to chain conveyor 12. Thus, when the leading edge of log 40 passes the pair of optical scanners 16 on second scanner mount 46, the cross section scanned at the leading edge is assumed to be a true X and Y position with respect to chain conveyor 12. This first cross section becomes known leading section 76, the significance of which will be explained shortly.

Figure 9:
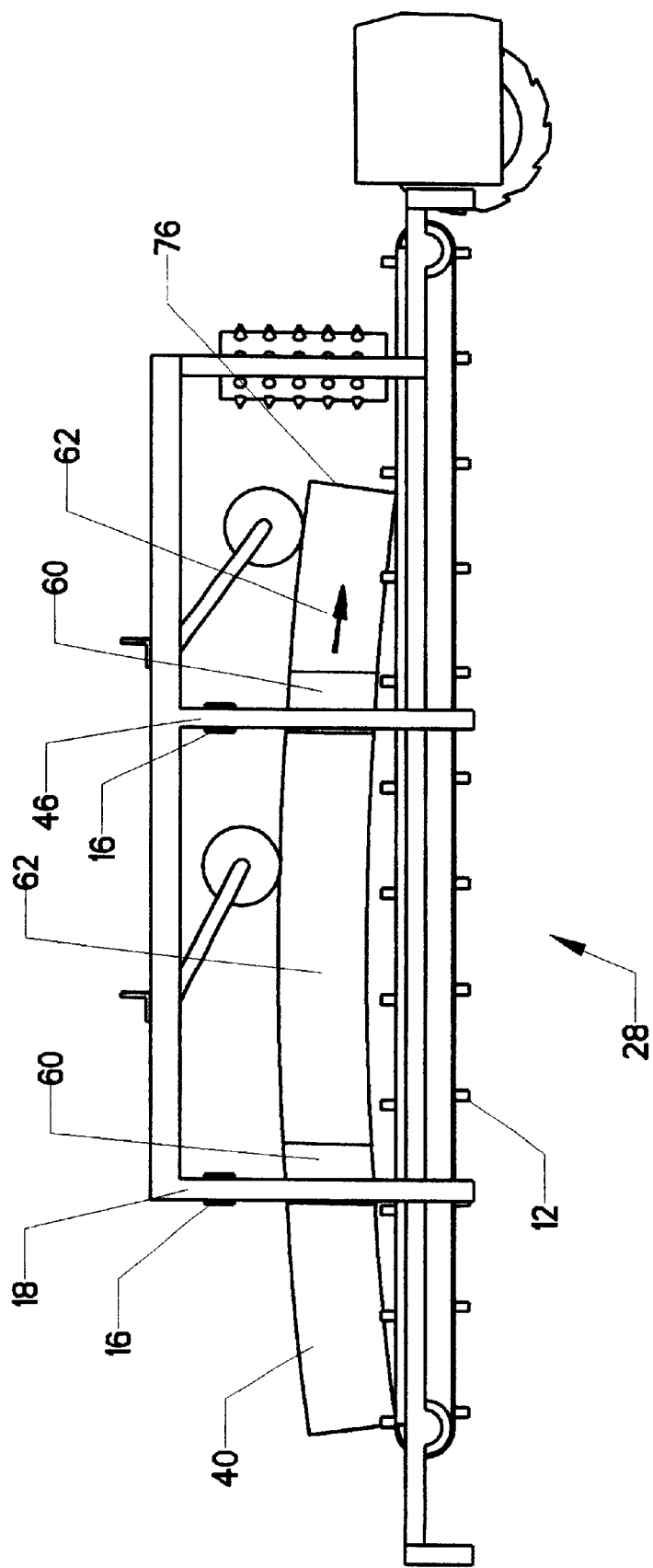
FIG. 9 is a side elevation view, showing a log when it has reached a stable position on the infeed assembly.

FIG. 9 shows log 40 after its trailing edge has translated onto chain conveyor 12. Log 40 is now purely in translation in the direction indicated. From this point until log 40 proceeds off the end of chain conveyor 12, the scan data collected by optical scanners 16 located at first scanner mount 18 and second scanner mount 46 is accurate in both its cross section and its X and Y position in space (since log 40 is no longer moving up and down and side to side). Any up and down or side to side undulations measured along log 40 may safely be assumed as real. Thus, the portions of log 40 which pass by first scanner mount 18 and second scanner mount 46 while log 40 is in this stable phase are denoted as full scan areas 60 in FIG. 9. It is important to realize that full scan areas 60 are actually composed of a plurality of cross sections, just like all the other cross sections obtained by optical scanners 16. However, within full scan areas 60, the X and Y position in space of each cross section is known.

Figure 10:
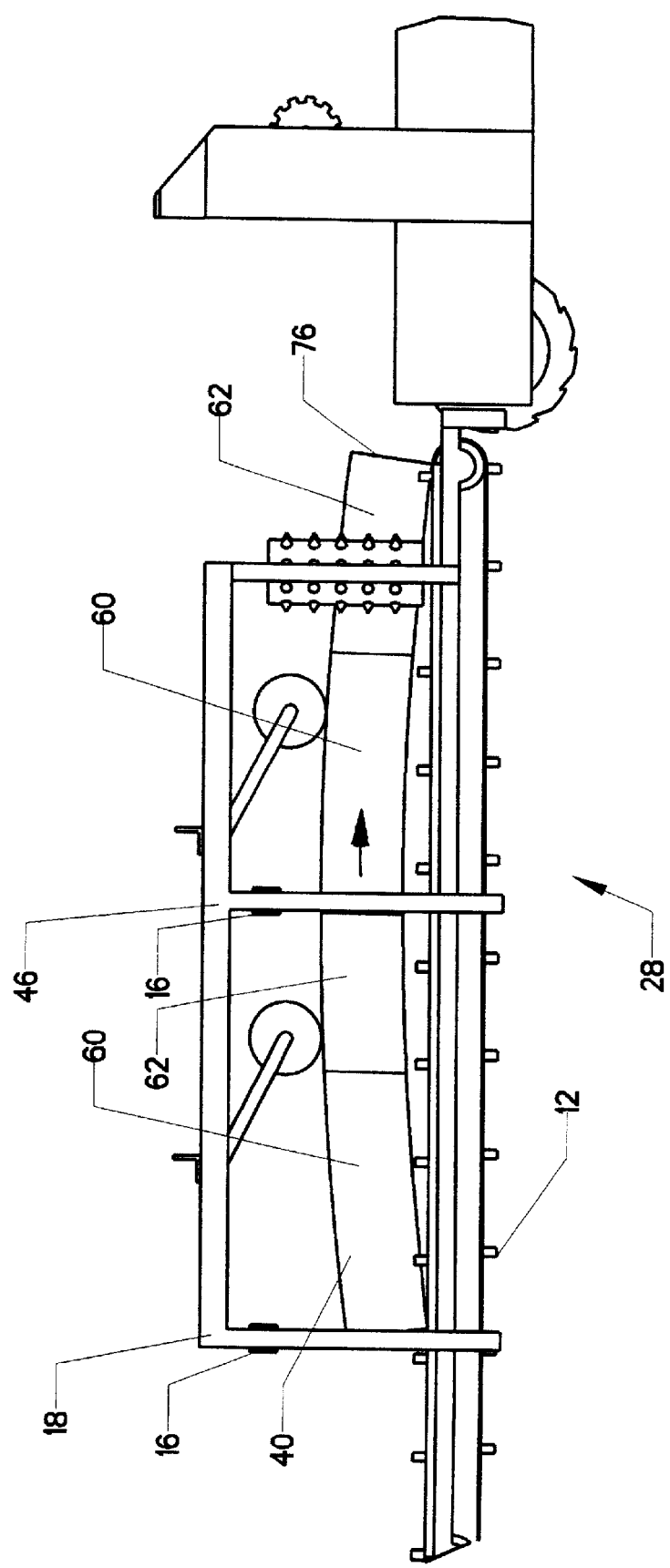
FIG. 10 is a side elevation view, showing a log transferring off the infeed assembly and into the bottom chipping assembly.

FIG. 10 shows log 40 when its leading edge is approaching the end of chain conveyor 12, and after it has been engaged by spike rolls 20. From its position in FIG. 9 until its position shown in FIG. 10, optical scanners 16 have been able to gain both cross-sectional and X and Y positional data on the portions of log 40 passing by them. The result is log 40 being divided into two full scan areas 60, two section scan areas 62, and known leading section 76.

Log 40, as shown, is sixteen feet long. If a shorter log is used, such as a twelve footer, then full scan areas 60 will cover a greater percentage of its surface (assuming a fixed sixteen foot infeed). This fact is true because the length of fill scan areas 60 remains constant despite the varying log length. As a shorter and shorter log is introduced, full scan areas 60 will cover more and more of the available surface. For an eight footer, full scan areas 60 will likely cover the entire surface. It is important to realize that the techniques disclosed will work for a log of any reasonable length. Even a twenty foot log could be handled.

Figure 11:
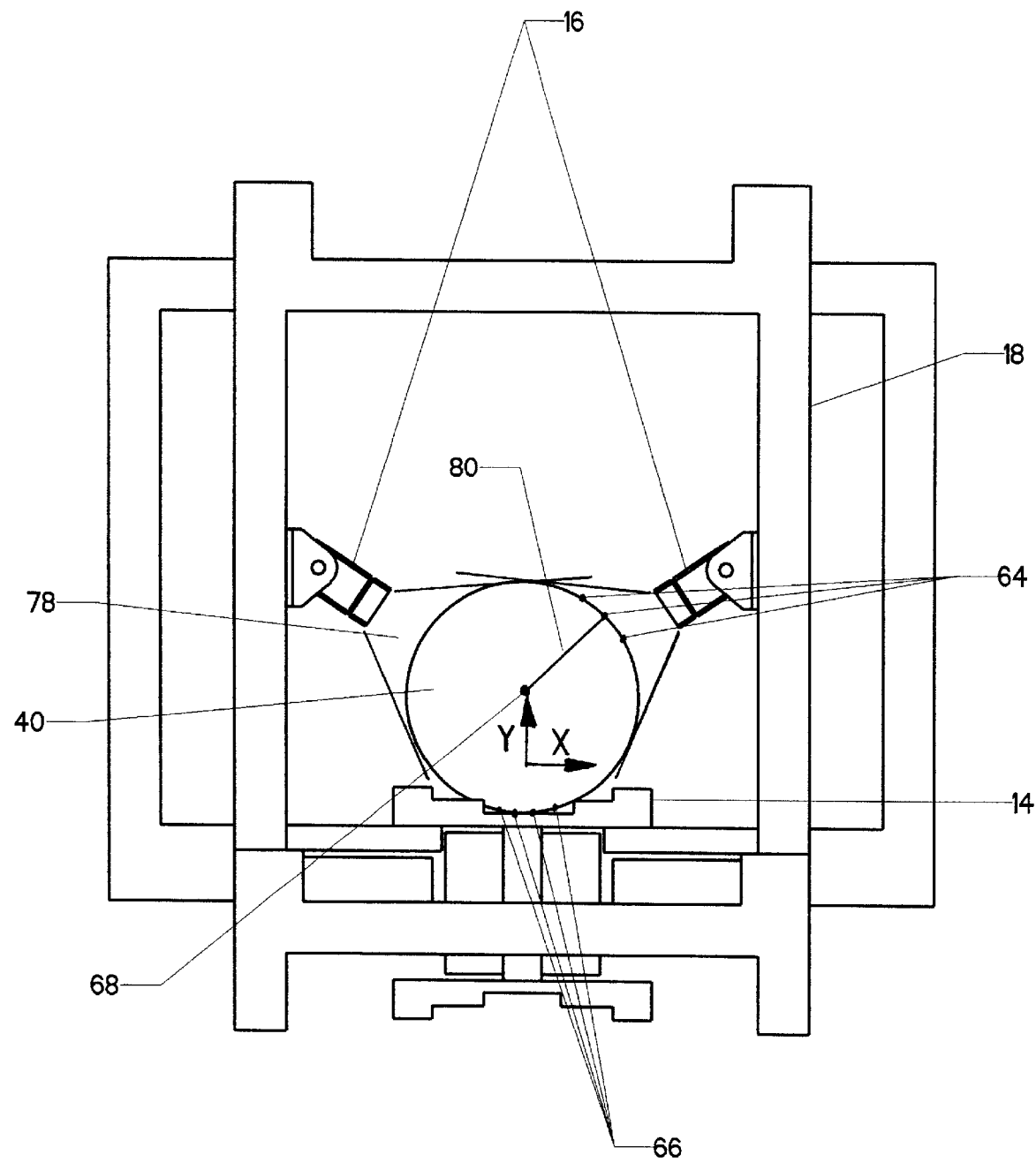
FIG. 11 is an elevation view showing a typical configuration of the optical scanners used to determine the cross section of a log.

FIG. 11 is a transverse elevation view across infeed assembly 28, taken at first scanner mount 18. Log 40 is shown positioned on chain flight 14 of chain conveyor 12. Each optical scanner 16 scans through a scan arc 78. Optical scanners 16 thereby determine a number of surface points 64 on the surface of log 40. A filtering program is used to eliminate outlying points, and an approximate curve is then fitted through the points using a polar coordinate system.

The reader will observe that the two scan arcs 78 do not encompass the lowest portion of log 40. The approximate curve is used to fill in this missing lower section. Approximated points 66 are calculated and substituted in for the missing data in this area. As an alternative, the reader should be aware that a set of three optical scanners 16 could be employed, which would allow accurate measurement of the bottom portion of log 40.

The completed cross section may be conceptualized as an outline of the log at that point. The X and Y position of this cross section may or may not be accurately known. If the cross section lies within one of the full scan areas 60, then the X and Y position is known. If it lies outside one of the full scan areas 60, then the X and Y position is not known. However, it is possible to determine a theoretical center point for all cross sections, as will be explained in the following.

Once the scanned cross section is complete, a computer is used to calculate calculated center 68. This computation is actually an iterative process. An initial approximation for calculated center 68 is computed by averaging the x and y coordinates for all surface points 64 and approximated points 66. A polar coordinate system is then established, centered on the initial calculated center 68 from the averaging process. A calculated radius 80 from this first calculated center 68 to the perimeter of log 40 is then calculated in increments around the polar coordinate system. Of course, each increment will be unlikely to exactly intersect one of surface points 64. Interpolation of the approximate curve is used to fill in the gaps between the surface points 64. When the calculation is performed for all 360 degrees of the polar coordinate system, a sum of the radii is taken. Calculated center 68 is then moved in a fixed increment toward the longest calculated radius 80.

The polar calculations are then performed again and a new sum of the radii is determined. This iterative process is continued up until a set limit of iterations has been reached, or until the difference in the sum of the radii in the new series of calculations and the last series of calculations falls below a set threshhold, at which point calculated center 68 is fixed for that given cross section. Because of the time constraints in the process, it is impractical to allow every iterative calculating to continue until it converges on a solution.

The X and Y coordinates of calculated center 68 may or may not be known (depending on whether the particular section is within one of the full scan areas 60). However, for all cross sections, the position of calculated center 68 is known with respect to the cross section itself.

Although the cross section of log 40 is shown as a circle, the reader should appreciate that the method disclosed will map a variety of complex shapes, accurately reflecting the log's true cross section. For purposes of visual simplicity, a more complex shape has not been illustrated.

FIG. 12 graphically illustrates the data known about log 40 after the scanning is complete. The two full scan areas 60 contain both cross sectional and X and Y positional data. Known leading section 76 also has cross sectional and X and Y positional data, since it is assumed to be stable relative to chain conveyor 12. In between, numerous cross sections 70 have known cross sectional data, but have unknown X and Y positions in space. In a sense, they are "floating" cross sections. However, each floating cross section 70 does have a calculated center 68. In addition, the longitudinal position of each cross section 70 (meaning its position along the direction of the log's travel) is known because the rate of chain conveyor 12 is known.

Full scan areas 60 are also composed of numerous cross sections, with numerous additional calculated centers 68. It is important to realize, however, that the calculated centers in full scan areas 60 and known leading section 76 have known X and Y positions relative to chain conveyor 12. These known calculated centers 68 may be used to generate a theoretical centerline for the entire log. Calculated centerline 72 is determined by curve-fitting a quadratic equation through the known calculated centers 68 within full scan areas 60 and known leading section 76. The resulting curve will look something like calculated centerline 72 in FIG. 12. Of course, it is not generally possible to calculate a quadratic which will pass precisely through each calculated center 68. Instead, the best quadratic curve is the one which passes, on the whole, the closest to all the centers. Many conventional mathematical methods may be used to generate such a quadratic, with the "least squares" method being one good example. A higher order curve fit could also be employed. However, a quadratic curve has been determined to possess enough accuracy for the job. The reader will also appreciate from the preceding disclosure that a quadratic must be fitted in two planes, in order to account for log 40's curvature in both the X and Y directions.

Next, using a mathematical translation, calculated center 68 of each floating cross section 70 is placed along calculated centerline 72. FIG. 12-B graphically illustrates this process. Cross section 70 is shown with its calculated center 68. The longitudinal position of this particular cross seciton 70 (the position along the long axis of the log) is known since the linear progress of the log is measured as it feed along the conveyor. Thus, the intersection of this particular cross section 70 with calculated centerline 72 can be determined. This point is shown in the view as translated center 86. Translation vector 84 is then calculated between calculated center 68 and translated center 86. All the measured points within cross section 70 are then shifted along translation vector 84, so that calculated center 68 then rests on top of translated center 86.

Again, the linear position of each cross section along the log's long axis is known. FIG. 13-B graphically depicts this positioning. Two successive cross sections are illustrated, with their translated centers 86 bring placed on calculated centerline 72. These two cross sections are then separated along calculated centerline 72 by separation distance 88. As explained previously, separation distance 88 is calculated by knowing the rate of scanning (for example, 30 cross sections per second) and the feed rate of the log (for example 5 feet per second). Thus, the longitudinal position of every cross section can be fixed as shown in FIG. 13-B.

FIG. 13 graphically depicts the data after calculated center 68 of each cross section 70 has been placed along calculated centerline 72. The log surface existing between each pair of successive cross sections 70 is then approximated. Many prior art techniques can be employed to create the surface model. FIG. 13-C illustrates one simple prior technique—linear interpolation. In this example, successive cross sections 70 are joined by smooth interpolation surfaces 90.

Although many known techniques could be used to create the surface model, the preferred embodiment creates quadrilaterals between the sections by connecting points on the first section to corresponding points on the second section. This technique creates a faceted surface, composed of many very small planes. FIG. 14 graphically depicts the completed surface model 82 of log 40. The reader should be aware that the actual cross sections generated by the scanners are much closer together than those illustrated in this disclosure. For purposes of visual clarity, the gaps have been widened. The reader should also be aware that the facets actually used to create the smooth surface model are too small to be seen in FIG. 14.

Although FIG. 14 shows log 40 with a relatively smooth surface, the reader should be aware that significant variations from cross section to cross section do occur. In order to gain maximum accuracy in the model, these variations would be represented. However, if the log abruptly changes from a large section to a small section and then back again, it may require considerable computation time to curve fit that variation. It is therefore often advisable to sacrifice some accuracy in order to obtain a smoother curve fit. Thus, if a significant variation is detected across a few cross sections, it is desirable to scale the sections using a rescaling transformation (expanding or shrinking their size), in order to achieve a smoother curve fit. This process does sacrifice some accuracy, but practical experience has shown that its benefits outweigh the small loss in accuracy.

The full surface model developed is used to determine the optimum pattern of sawn lumber that may be cut from log 40. These computations are made in real time by a computer as log 40 progresses along chain conveyor 12. Typically, a number of trial fits for various dimensioned framing lumber pieces are attempted. These computations do require an appreciable amount of time. Returning to FIG. 10, the scanning operation must be terminated while the leading edge of log 40 is still approximately two feet away from bottom chipping head 32. The reader will recall that log 40 is progressing along chain conveyor 12 at a rate of 300 to 400 feet per minute (5 to 7 feet per second). This early termination of the scanning is needed because there must be sufficient time to perform the above-described calculations and move the chipping heads into the proper position to cut the optimum pattern. Thus, while one might think that the leading full scan area 60 could be extended further than is shown in FIG. 10, the aforementioned time constraints mean that it cannot.

FIG. 15 illustrates the ultimate use for the surface model created. Surface model 82 is used to trial fit various dimensioned lumber that could be cut from the avaiable volume. Optimized cutting pattern 92 is an ideal configuration of lumber which can be harvested from the volume available within surface model 82. As these optimization techniques are well known in the prior art, they will not be described in detail.

Summary, Ramifications, and Scope

Accordingly, the reader will appreciate that the proposed invention allows a full surface model of the log to be created without the need for interruption in the log's movement along the line. The invention has further advantages in that:

1. It provides a full model of the log's surface, rather than just silhouette data;
2. It models the log's cross sections using enough surface points to accurately reflect the shape of the log, rather than using approximating circles or ellipses;
3. It scans and maps the surface of the log before any chipping or sawing is performed;
4. It scans and maps the log's surface without requiring a significantly lengthened infeed conveyor;
5. It uses the developed surface model of the log to compute the optimum solution of dimensioned lumber to be cut from the log; and
6. It provides a scanning and mapping system that is fast enough to allow the scanning of the log, generation of the surface model, computation of the optimum lumber solution, and movement of the chipping heads and saws, while the log is traveling at line speed.

Although the preceding description contains significant detail, it should not be construed as limiting the scope of the invention but rather as providing illustrations of the preferred embodiment of the invention. As may be readily understood from disclosure, the optimization techniques may be applied to many different types of lumber sawing. The examples provided relate specifically to the sawing of dimensioned lumber, but the invention is more broadly applicable.

Likewise, the mathematical curve fitting techniques disclosed are merely representative. Many different types of mathematical curve fitting could be used to perform the needed interpolations and to generate calculated centerline 72. Thus, the scope of the invention should be fixed by the following claims, rather than by the examples given.

Having described our invention, we claim:

1. A process for creating a surface model of a log having a long axis as it progresses along a conveyor in the direction of said long axis, so as to optimize the lumber which can be cut from said log, comprising:
   a. scanning a known leading section of said log as said log progresses onto said conveyor while the lower extremity of said known leading section is still in contact with said conveyor but before said log is stable on said conveyor so that it is possible to determine the outline of said known leading section and its position relative to said conveyor;
   b. mathematically determining a center point for said known leading section;
   c. scanning a first set of cross sections transverse to said long axis of said log as said log progresses along said conveyor but before said log is stable on said conveyor so that it is possible to determine the outline of said cross sections but not their positions relative to said conveyor;
   d. mathematically determining a center point for each of said cross sections in said first set;
   e. scanning one full scan area in which a second set of cross sections is determined after said log has become stable on said conveyor so that it is possible to determine the outline of said cross sections and their position relative to said conveyor;
   f. mathematically determining a center point for each of said cross sections within said second set;
   g. determining a distance between each of said cross sections;
   h. mathematically curve fitting a calculated centerline which passes nearly through said center points of said second set of cross sections and said center point of said known leading section;
   I. mathematically positioning said first set of cross sections with respect to said conveyor by placing said center point of each of said cross sections within said first set on said calculated centerline, and spacing said cross sections apart according to said distances between said cross sections; and
   j. creating a surface model by interpolating the regions between said first set of cross sections and said second set of cross sections.

2. A process for creating a surface model of a log having a long axis as it progresses along a conveyor in the direction of said long axis, so as to optimize the lumber which can be cut from said log, comprising:
   a. scanning a known leading section of said log as said log progresses onto said conveyor while the lower extremity of said known leading section is still in contact with said conveyor but before said log is stable on said conveyor so that it is possible to determine the outline of said known leading section and its position relative to said conveyor;
   b. mathematically determining a center point for said known leading section;
   c. scanning a first set of cross sections transverse to said long axis of said log as said log progresses along said conveyor but before said log is stable on said conveyor so that it is possible to determine the outline of said cross sections but not their positions relative to said conveyor;
   d. mathematically determining a center point for each of said cross sections in said first set;
   e. scanning a first full scan area in which a second set of cross sections is determined after said log has become stable on said conveyor so that it is possible to determine the outline of said cross sections and their position relative to said conveyor;
   f. mathematically determining a center point for each of said cross sections within said second set;
   g. scanning a third set of cross sections transverse to said long axis of said log as said log progresses along said conveyor but before said log is stable on said conveyor so that it is possible to determine the outline of said cross sections but not their positions relative to said conveyor;

h. Scanning a second full scan area in which a fourth set of cross sections is determined after said log has become stable on said conveyor so that it is possible to determine the outline of said cross sections and their position relative to said conveyor;

I. mathematically determining a center point for each of said cross sections within said fourth set;

j. determining a distance between each of said cross sections;

k. mathematically curve fitting a calculated centerline which passes nearly through said center points of said second set of cross sections, said center points of said fourth set of cross sections, and said center point of said known leading section;

l. mathematically positioning said first set of cross sections with respect to said conveyor by placing said center point of each of said cross sections within said first set on said calculated centerline, and spacing said cross sections apart according to said distances between said cross sections;

m. mathematically positioning said third set of cross sections with respect to said conveyor by placing said center point of each of said cross sections within said third set on said calculated centerline, and spacing said cross sections apart according to said distances between said cross sections; and n. creating a surface model by interpolating the regions between said first set of cross sections and said second set of cross sections.

3. A process as recited in claim 2, wherein said scanning of said first fill scan area and said second full scan area is conducted simultaneously using two separate scanners.

4. A process as recited in claim 2 wherein said process is controlled by an electronic computer.

* * * * *